XR 3,712,724

SEARCH ROOM

United Stat[e]

Courtney-Pratt

SUBSTITUTE FOR MISSING XR

[11] 3,712,724

[45] Jan. 23, 1973

[54] OPTICAL READOUT APPARATUS

[75] Inventor: Jeofry Stuart Courtney-Pratt, Locust, N.J.

[73] Assignee: Bell Telephone Laboratories, Incorporated, Murray Hill, Berkeley Heights, N.J.

[22] Filed: Dec. 3, 1970

[21] Appl. No.: 94,672

[52] U.S. Cl. ..........353/25, 95/37, 353/30, 353/38

[51] Int. Cl. ...G03b 23/02, G03b 21/26, G03b 21/14

[58] Field of Search ...353/25, 30, 38; 352/81; 95/36, 95/37

[56] References Cited

UNITED STATES PATENTS

| | | | |
|---|---|---|---|
| 3,267,826 | 8/1966 | Browning | 95/37 |
| 2,950,644 | 8/1960 | Land et al. | 353/25 |
| 3,561,859 | 2/1971 | Heckscher et al. | 353/25 |
| 3,459,111 | 8/1969 | Cooper | 95/36 R |
| 3,485,158 | 12/1969 | Kumagai | 95/36 R |

*Primary Examiner*—Leonard Forman
*Assistant Examiner*—Steven L. Stephan
*Attorney*—R. J. Guenther and Edwin B. Cave

[57] ABSTRACT

This disclosure describes optical readout apparatus which utilizes numerous partial images produced by lenticular plate optics to compose an image on a screen. The recorded medium and lenticular plate remain stationary and advantageously are a single replaceable unit. Slight X–Y movement of an aperture plate stationed forward of the lenticular plate reproduces a set of partial images for each of its numerous positions, each set composing on a screen into a section of reading matter. The device is useful as an optical telephone directory.

9 Claims, 6 Drawing Figures

INVENTOR
J. S. COURTNEY-PRATT
BY Charles E. Graves
ATTORNEY

OPTICAL READOUT APPARATUS

FIELD OF THE INVENTION

This invention relates to image projection in general, and specifically to optical readout apparatus.

BACKGROUND OF THE INVENTION

The need to condense vast quantities of data for visual readout is increasingly critical in view of the on-going information explosion. The storage and retrieval of telephone directory data at all coin telephone locations is a case in point, and the present invention is explained in terms of coin telephone applications.

Present telephone directories have a "shelf life" averaging perhaps 6 months at pay stations, the period being reduced sometimes to 2 weeks or even less with heavy usage. Directory printing and replacement costs are substantial, and hence quite burdensome with high directory turnover. Costs are also the main determinant of the updating interval. Yet, the present annual interval is proving unduly long, given the high rate of change in the listed data.

Thus incentives exist to replace book-type directories with a sturdier readily updatable library usable by pay phone customers. Toward this end, many proposals have been made for visual display readers permanently installed in or near the phone booths. Typically, these store number and address data microphotographically. A customer operating a viewer causes the relevant page information to appear on a screen.

Size, cost, and complexity of the readout unit are obvious main factors governing its feasibility. The unit must be sufficiently compact so as not to consume limited booth space. The data record must be updatable at frequent intervals and at low cost and must be easily yet securely installed in the unit. The desired directory page must be accessible by a customer with minimum motion and delay.

The present invention takes as its broad object an optimizing of the foregoing considerations.

SUMMARY OF THE INVENTION

The invention uses a recording medium in conjunction with a lenticular plate and a reading mask. The plate and recording medium are held in fixed relation. The mask comprises an array of holes corresponding in number and layout to a subset of the lenticules.

A prescribed number of images—each containing directory data for a portion of a page—are recorded on the medium behind each lenslet. For example, alphabetically successive page portions are recorded by moving the mask in discrete steps across the face of the lenticular plate, to positions of close registry with successive lenslet subsets. Readout is achieved by illuminating the described subset of photographic recordings, and concurrently placing the mask into registry with the corresponding subset of lenslets. The several images are projected onto a display screen and combine to reproduce the page photographed.

The invention and its further objects, features, and advantages will be fully appreciated from a reading of the description to follow of an illustrative embodiment thereof.

DETAILED DESCRIPTION OF THE DRAWING

Figures 1, 2:
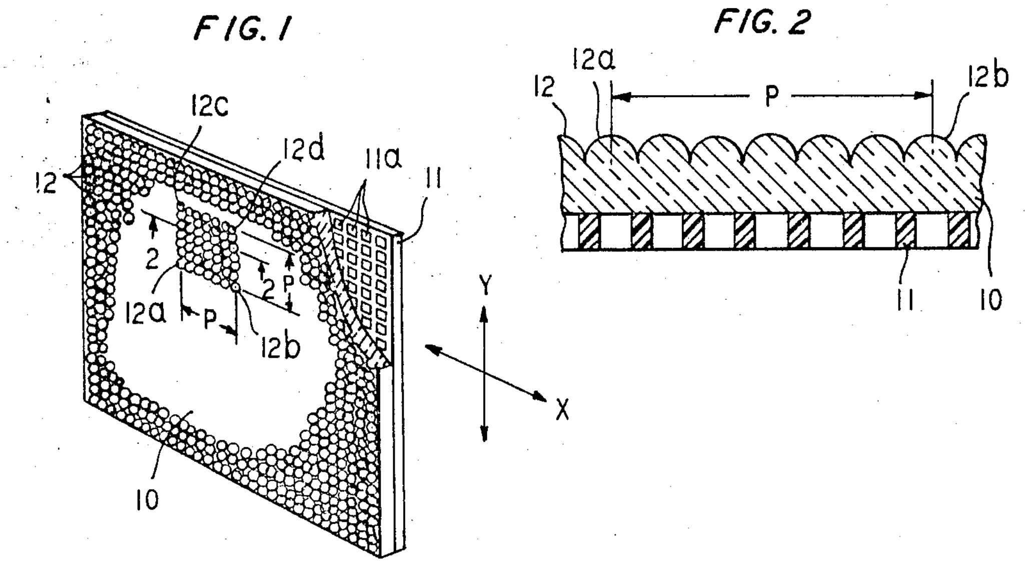
FIG. 1 is a frontal perspective view of a lenticular plate and recording medium assembly.
FIG. 2 is a side sectional partial view of the FIG. 1 assembly.

FIG. 1 shows a lenticular plate 10 and a photographic recording medium 11 directly behind or on the reverse side of the plate 10. The individual lenslets or lenticules formed on plate 10, and designated 12, are—for example—each 0.6 mm in diameter. Each is essentially tangent to its neighbors in an X–Y matrix. The plate 10 and associated recording medium 11 may be detachable from one another; or advantageously may be constructed as a permanently assembled unit.

In FIG. 2 a part of a side section of the assembly of FIG. 1 is shown. A pitch P is defined as the distance between two selected lenslets in a row along the X-axis, such as the distance between lenslets **12*a* and 12*b*. The same pitch distance obtains along the Y-axis between lenslets 12*a* and 12*c*, and between lenslets 12*b* and 12*d* as illustrated in FIG. 1. The pitch P may, for example, be 60 mm; and where the lenslet diameter is the earlier-mentioned 0.6 mm, there are thus 100 lenslets along the illustrated row from lenslet 12*a* up to lenslet 12*b***.

Figure 3:
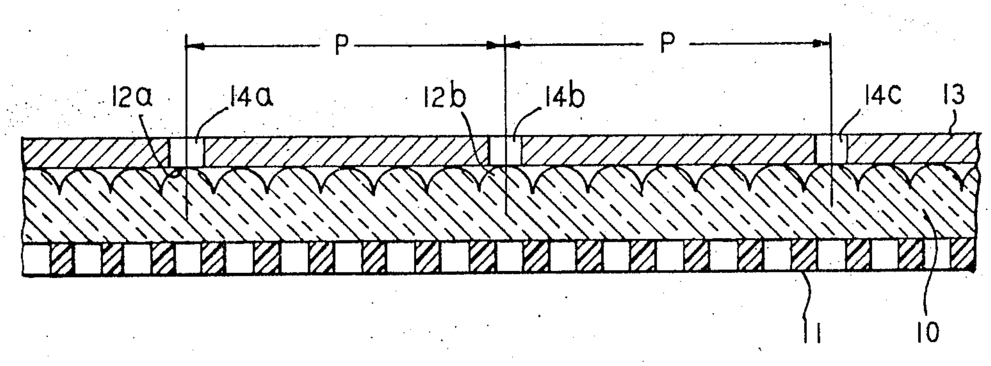
FIG. 3 is a side sectional partial view of the FIG. 1 assembly, plus an aperture plate.
Figure 4:
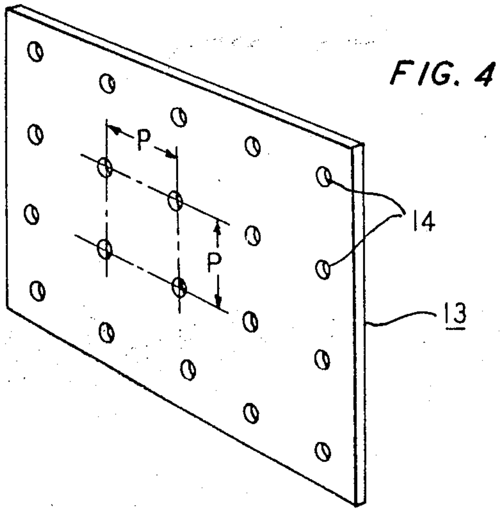
FIG. 4 is a frontal perspective view of the aperture plate.

An aperture plate 13 shown alone in FIG. 4 and in side sectional view in FIG. 3, comprises a discrete number of apertures 14—as, for example, 20 apertures 14 in a 5 by 4 X–Y array. Pursuant to one aspect of the invention, the center-to-center spacing between all adjacent apertures, such as apertures **14*a* and 14*b***, along either axis is equal to the above-defined pitch P. Where, as in this example, the lenslet diameter is 0.6 mm, the apertures advantageously are of a lesser size, such as 0.5 mm in diameter.

Aperture plate 13 is placed in near-contacting relation to the lenticule side of plate 10 as in FIG. 3; and made positionable in a plane parallel to that of the lenticules 12. The apertures thus align with successive discrete sets of lenslets. Each such set contains 20 lenslets, corresponding in this example to the number of apertures in plate 13. Given the exemplary pitch distance P of 60 mm and the lenslet diameter of 0.6 mm, it follows that movement of aperture plate 13 to 100 discrete positions along the X-axis is possible without exposing any given lenslet twice to an aperture. Similarly, for each such position along the X-axis, there are 100 discrete positions along the Y-axis to which the aperture plate 13 can be moved—again, without exposing any given lenslet twice to any aperture.

Accordingly, it is seen that in the above scheme, aperture plate 13 can be moved to 10,000 different positions across the face of lenticular plate 10, for each one of which a different set of twenty lenslets is contacted by the twenty apertures 14. This movement involves a maximum translation of 60 mm in the X-direction and 60 mm in the Y-direction for the plate 13.

Recording upon photographic medium 11 is achieved using appropriate conventional optical apparatus, not shown. An image of a desired object, such as a portion of a directory page, or an entire page, is projected through apertures 14 while aperture plate 13 is stationed in a selected one of its 10,000 different positions with respect to lenticular plate 10. Successive directory pages or portions are thus recorded by repositioning aperture plate 13 for each page. The entire directory thus is contained photographically on medium 11, in discrete exposed regions such as regions 11a of FIG. 1. Resolution of 250 line pairs across each lenslet's format being readily achievable, each set of twenty lenslets will record information corresponding to that of an entire page from, for example, the Manhattan white pages telephone directory. As the latter is 1,900 pages long in 1970, it is seen that the entire book and four others of the same size can be recorded on a single photographic medium approximately 11 by 13 inches.

Figure 5:
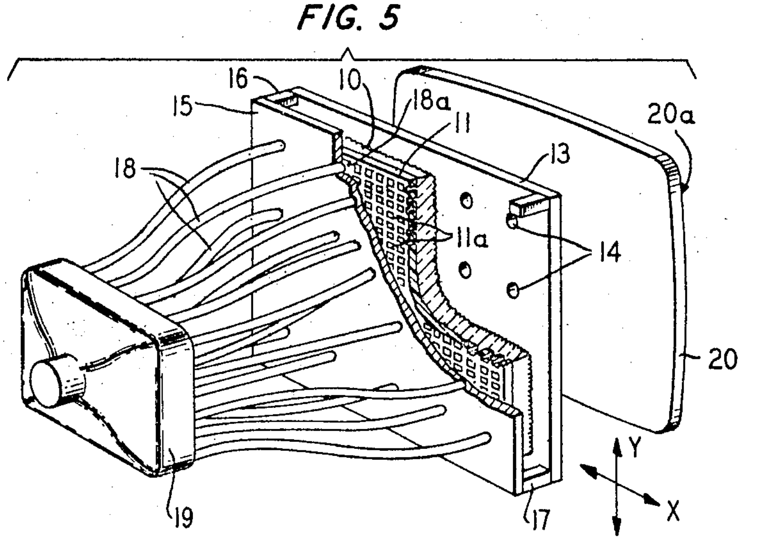
FIG. 5 is a schematic perspective view of the optical readout apparatus.

The apparatus for readout of the recorded information comprises the elements depicted in FIG. 5. Lenticular plate 10 and photographic medium 11 are assembled as a unit, advantageously, and are held stationary in the position shown by any suitable expedient. Aperture plate 13 is disposed across the lenticule side of plate 10.

Illumination of each lenslet subset successively contacted or exposed by the several apertures 14 is achieved, advantageously, by the faceplate 15 shown in FIG. 5. A plurality of optical light guides 18, comprising optical fiber bundles or elements, illuminated from a source 19, for example, are terminated in faceplate 15 at positions corresponding in center-to-center spacing to that of apertures 14. Faceplate 15 and aperture plate 14 are advantageously held in fixed relation, as with several spacer legs such as 16, 17, such that the light guide ends mounted in faceplate 15 are in axial alignment with the corresponding apertures 14 and closely adjacent thereto. Further, the leg length is such that the aperture plate 13 is closely spaced with respect to the lenslets 12 of plate 10.

The faceplate 15 and its light guides 18 move in unison with aperture plate 13, in the X-Y plane denoted in FIG. 5, while the lenticular plate-photo medium assembly remains stationary. Each light guide 18 end such as end 18a in FIG. 5 is sized to illuminate only one of the exposed regions 11a at a time. Further efficiency of illumination is realized by directing the light guide ends 18a onto the exposed regions 11a, while avoiding actual contact. The manner of achieving this spacing, as well as the mounting and movement of the details earlier described, form no part of the present invention and hence are omitted.

Illumination through the back of the regions 11a by light guides 18 causes 20 images to be projected by the associated 20 lenslets. These images are composed upon a suitable screen 20 into the directory page which they collectively represent. To read this information, the screen 20 is viewed from out-facing side 20a. Adjustment of the aperture-plate faceplate assembly in the X-Y plane enables a search to be made for the page containing the desired directory information. It is, of course, desirable to print the regions 11a in some known alphabetical sequence to facilitate the search.

Aperture plate 13 can be constructed of a normally transparent medium, such as glass, on which an opaque coating has been placed and then selectively removed to form the desired pattern of apertures 14. Or, plate 13 can be of a normally opaque material such as stainless steel, in which a pattern of holes has been produced as by drilling or etching. The photoemulsion used on recording medium 11 can be Eastman Kodak Type 649, for example, or a like material having the characteristics of high resolution and stability. It should be understood that the dimensions for pitch P, the lenslet diameter, the aperture diameter, and other features given above are exemplary only, and could easily be changed to optimize a different format. Further, although it is desirable to place the lenticular plate 10 and the recording medium 11 in the same permanent assembly—indeed, on the same substrate—a detachable arrangement for replacing the recorded data without also replacing the lenticular plate may be advantageous.

Figure 6:
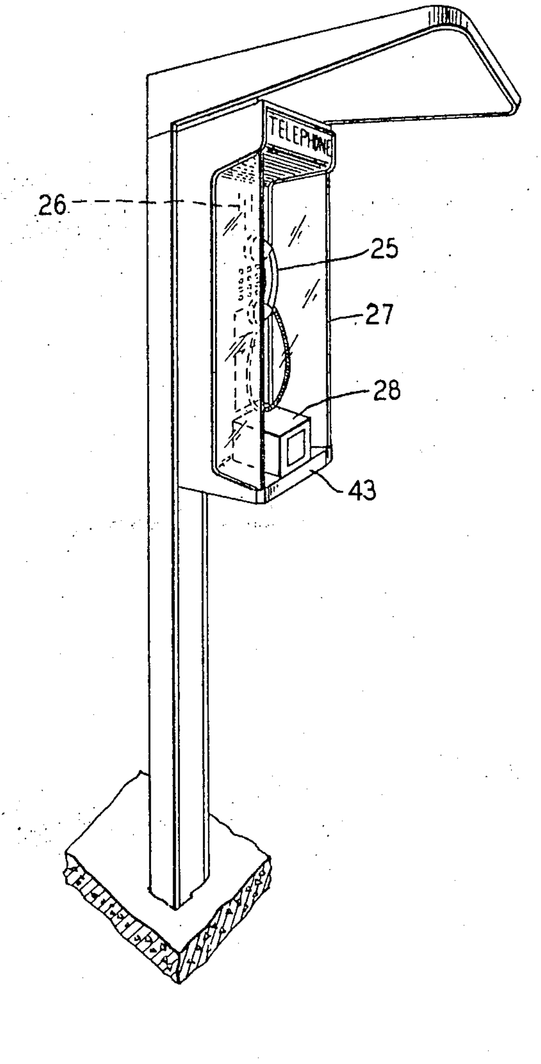
FIG. 6 is a schematic perspective view of the readout apparatus mounted on a telephoning facility.

The optical readout apparatus depicted schematically in FIG. 5 can be mounted in association with a coin telephone station, for example, as shown in FIG. 6. The station, designated 25 is mounted on a backboard 26 within a telephoning confine 27. The readout apparatus is contained in a suitable housing 28 mounted, for example, or service shelf 43.

It is obvious that the readout apparatus and the general storage and retrieval methods described are not limited in their application to handling of telephone directory data. Generally the invention is useful wherever it is necessary to reproduce at numerous locations the same large quantities of data, and to update the data en masse at fairly regular intervals.

It is to be understood that the embodiments described herein are merely illustrative of the principles of the invention. Various modifications may be made thereto by persons skilled in the art without departing from the spirit and scope of the invention.

What is claimed is:

1. Apparatus for storing and projecting data as a visual display comprising, in combination, a fixed lenticular plate comprising an X-Y array of evenly spaced lenticules;

aperture means adjacent to said lenticules and comprising an X-Y pattern of evenly spaced apertures, the spacing between any two adjacent said apertures being a large and constant integer multiple of the spacing between any two adjacent said lenticules so that each said aperature exposes one lenticale, a set of lenticules being exposed by said pattern of apertures;

means for moving said aperture means in an X-Y plane to expose through said aperture pattern successive sets of lenticules;

a photographic medium fixed behind said lenticular plate and comprising a recorded image behind each said lenticule, the several images behind each of the successive said sets of lenticules composable into a unit of data to be displayed; and means for projecting successive said image sets through said aperture pattern onto a screen, the movement of said apertures to positions along said axes being confined to a range that exposes each said lenticule once to an aperture, but none twice.

2. Apparatus pursuant to claim 1, wherein said lenticular plate and said photographic medium comprise a unitary assembly, and said assembly is held stationary with respect to said aperture plate.

3. Apparatus pursuant to claim 2, wherein said images are recorded directly upon the reverse side of said lenticular plate.

4. Apparatus pursuant to claim 2, wherein said projecting means comprises a light source and light guides extending from said source to positions closely adjacent to said medium, the spacing between said positions corresponding with the spacing of said aperture pattern, and means maintaining said light guide positions in alignment with said apertures as said aperture plate moves.

5. Apparatus pursuant to claim 4, wherein said maintaining means comprises a faceplate for receiving the ends of said light guides, and means rigidly connecting in parallel relation said faceplate and said aperture plate.

6. Apparatus pursuant to claim 4, wherein said light guides comprise optical fiber elements and wherein said apertures are square.

7. Apparatus for storing and projecting telephone directory information as a visual display, comprising in combination:

a fixed lenticular plate comprising an X–Y array of evenly spaced lenticules;

aperture means adjacent to said lenticules and comprising an X–Y pattern of spaced apertures, the spacing between any two adjacent said apertures being a large integer multiple of the spacing between any two adjacent said lenticules so that each said aperature exposes one lenticule, a set of lenticules being exposed by said pattern of apertures;

means for moving said aperture means in an X–Y plane to expose through said aperture pattern successive sets of lenticules, the movement of said apertures to positions along said axes being confined to a range that exposes each said lenticule once to an aperture, but none twice;

a photographic medium fixed behind said lenticular plate and comprising a recorded image of a portion of a selected page of said telephone directory behind each said lenticule, the several images associated with each of the successive said sets of lenticules composable into a readable image of said directory page when illuminated; and means for projecting successive said image sets through said aperture pattern onto a screen.

8. Apparatus pursuant to claim 7, wherein said lenticular plate and said photographic medium comprise a unitary assembly, and said assembly is held stationary with respect to said aperture plate.

9. Apparatus pursuant to claim 8, wherein said projecting means comprises a light source and light guides extending from said source to positions closely adjacent to said medium, the spacing between said positions corresponding with the spacing of said aperture pattern, a faceplate for receiving the ends of said light guides, and means rigidly connecting in parallel relation said faceplate and said aperture plate.

* * * * *